March 9, 1954  G. L. LEWIS  2,671,242
HYDRAULIC CASTER LIFT
Filed April 6, 1951  2 Sheets-Sheet 1
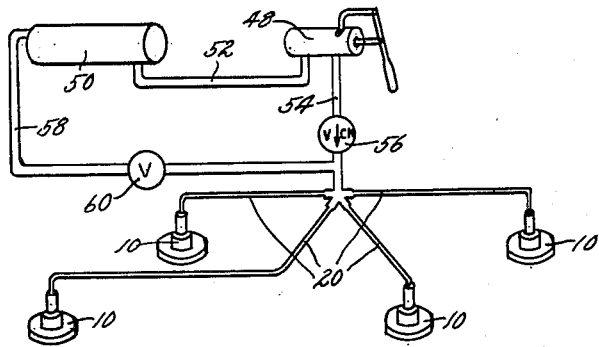
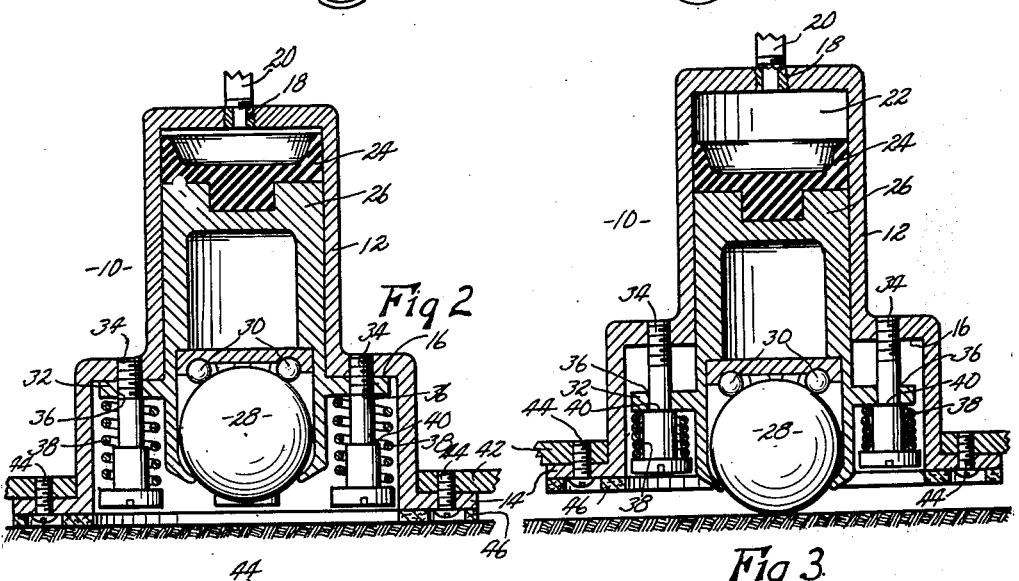
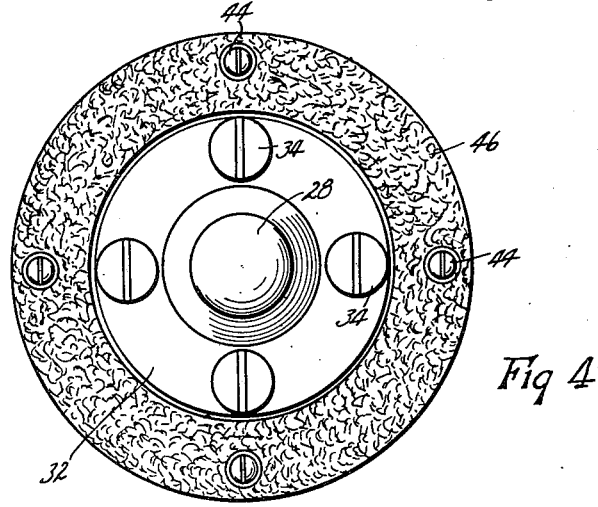
INVENTOR,
Gilbert L. Lewis.
BY
Hamilton & Hamilton,
Attorneys.

March 9, 1954 G. L. LEWIS 2,671,242
HYDRAULIC CASTER LIFT
Filed April 6, 1951 2 Sheets-Sheet 2
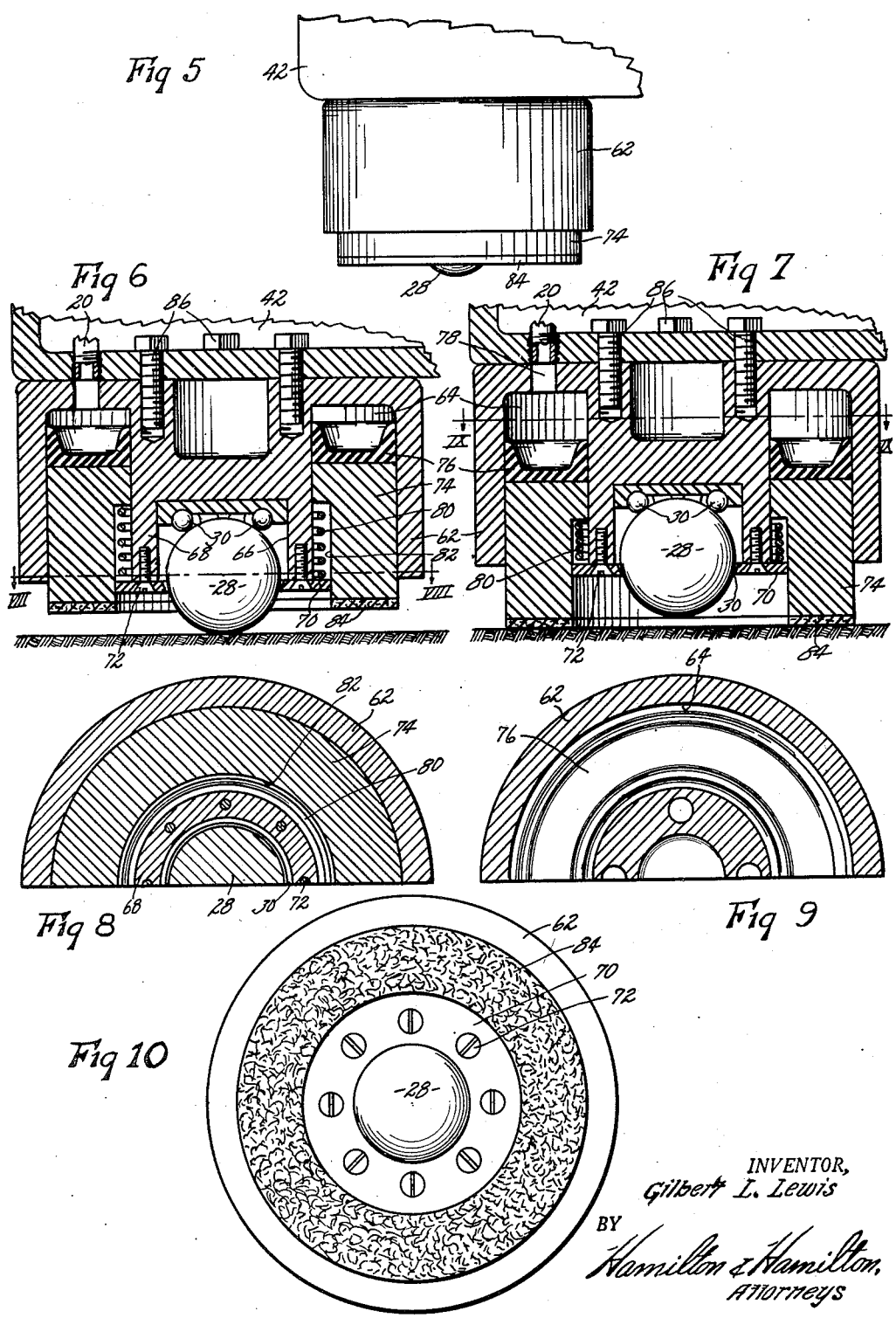
INVENTOR,
Gilbert L. Lewis
BY
Hamilton & Hamilton
Attorneys Patented Mar. 9, 1954

2,671,242

UNITED STATES PATENT OFFICE 2,671,242

HYDRAULIC CASTER LIFT

Gilbert L. Lewis, Kansas City, Mo.

Application April 6, 1951, Serial No. 219,587

1 Claim. (Cl. 16—33)

My invention relates to new and useful improvements in hydraulically operated casters particularly adapted for use on heavy furniture and appliances.

The principal object of the present invention is the provision of a caster having a hydraulically driven piston so that by operation of a master hydraulic cylinder the rollers are projected from a recess in the hydraulic cylinder and the weight of the appliance to which the casters are attached is taken by the casters to permit easy rolling of the appliance about the floor.

A further object of my invention is to provide a relatively large resting surface on which the appliance is supported when the caster is retracted into the recess in the hydraulic cylinder, thereby preventing damage to the floor surface.

Other objects are ease and convenience of operation, simplicity of installation and economy of construction.

With these objects in view, and others which will appear during the course of the specification, reference will be had to the drawings, wherein:

Fig. 1 is a schematic view showing the hydraulic system used in my invention.

Fig. 2 is a longitudinal sectional view of a caster with some parts left in elevation and embodying a preferred form of my invention, showing the device with the hydraulic pressure released.

Fig. 3 is a longitudinal sectional view similar to Fig. 2 and showing the device with the caster lowered into operable position by hydraulic pressure.

Fig. 4 is an inverted plan view of the device shown in Figs. 2 and 3.

Fig. 5 is a reduced side elevation of a modified form of my invention.

Fig. 6 is an enlarged longitudinal sectional view of the device shown in Fig. 5, with parts left in elevation, and showing the device with the hydraulic pressure released.

Fig. 7 is a view similar to Fig. 6 and showing the device with the resting surface lowered into operable position by hydraulic pressure.

Fig. 8 is a partial sectional view taken on line VIII—VIII of Fig. 6.

Fig. 9 is a partial sectional view taken on line IX—IX of Fig. 7.

Fig. 10 is an inverted plan view of the device in the modified form.

Like numerals refer to similar parts throughout the several views and numeral 10 refers to a caster in the preferred form having a housing 12. Said housing has a flange 14 formed at its lower edge to present a horizontal surface on its lower and upper sides. Said housing also has a shoulder 16 intermediate its ends which extends horizontally inwardly from a point directly above the inner edge of flange 14, for a purpose to be described later in the specification. The upper end of said housing is formed horizontally and is provided with a threaded hole 18 in which a high pressure tube 20 is securely attached. Hydraulic fluid is admitted through tube 20 into chamber 22 formed by the internal walls of housing 12 and cup 24 which forms the lower side of said chamber. Said cup is conformable to the inner walls of housing 12 and when hydraulic pressure is brought against it will prevent leakage of the fluid between the cup and the inner housing walls.

Said cup 24 is securely attached to upper side of piston 26. Piston 26 conforms to the shape of chamber 22 and is slidably inserted therein. The lower portion of said piston is hollow and formed to receive roller ball 28. Said roller ball is rotatable and held in operable position by means of inwardly swedged lower edge of piston 26. Ball bearing 30 is carried within the hollow portion of piston 26 and is disposed so that roller ball 28 rotates thereon when the ball 28 has been lowered into operating position by means of hydraulic pressure exerted on cup 24 and piston 26, as best shown in Fig. 3.

Intermediate its ends provided with a radial piston 26 is flange 32 which extends horizontally outwardly from said piston and is disposed beneath shoulder 16. A plurality of equidistantly spaced bolts 34 are secured to shoulder 16 and extend downwardly therefrom to a point adjacent the floor surface. Said bolts 34 slidably extend through holes 36 in flange 32. Springs 38 are suitably placed on bolts 34 and disposed between the heads of bolts 34 and shoulder 16. Intermediate the ends of bolts 34 are shoulders 40 whose purpose will be described later.

The caster is attached to furniture or appliances 42 by means of a plurality of screws 44 which extend through flange 14 and into the furniture or appliance. A pad 46 of felt or other suitable material is attached to the under side of flange 14. Said pad is cutaway around bolts 44 so that the pad extends below the heads of said bolts.

When the caster is in its normal position piston 26 is held at the upper end of its stroke by means of springs 38. The upward stroke of said piston is limited by the contact of flange 32 with shoulder 16 as shown in Fig. 2. When the caster is in its normal position and roller ball is retracted above the floor surface and the weight of the furniture or appliance is supported on pad 46.

When hydraulic pressure is applied piston 26 is lowered and the weight of the appliance is transferred from the said pads to the roller ball 28. The downward movement of the piston is limited by the contact of flange 32 with shoulders 40. Thus when the piston has been completely lowered the furniture or appliance may be easily moved about on roller 28. When the appliance or furniture is in the desired place the hydraulic pressure may be released and the piston 26 will be urged again to the upper end of its stroke by springs 38 and the furniture or appliance will again be supported on the protective pads 46.

The hydraulic system used with this device is schematically shown in Fig. 1 and consists of a pump 48 the intake of which is connected to a reservoir tank 50 by means of tube 52. The delivery side of pump 48 is connected through common tube 54 to tubes 20. Intermediate the pump and tubes 20 is a check valve 56 in tube 54 to prevent the flow of hydraulic fluid back to the pump. A return tube 58 is connected at one end to common tube 54 at a point between the check valve 56 and tubes 20 and at the other end to reservoir tank 50. A valve 60 is in return tube 58 at a point between the reservoir tank and the common tube 54. Said valve 60 being for the purpose of relieving the hydraulic pressure on pistons 26 when it is desired to allow the casters to assume their normal positions.

A modified form of my invention is shown in Figures 5, 6, 7, 8, 9, and 10, and embodies the same principles as are described in the preferred form.

In the modified form 62 indicates a housing comprising a cylinder having a concentric annular groove 64 formed in its lower side adjacent its periphery and extending upwardly to a point adjacent the upper end of the housing forming an annular hydraulic cylinder. Said cylinder also has a recess 66 formed centrally in its lower side. Ball bearing 30 is attached to the upper wall of recess 66. Said recess 66 is of such diameter as to leave depending skirt 68 between said recess and annular groove 64 and extends deep enough to allow roller ball 28 to rotate freely therein. Roller ball 28 rotates on ball bearing 30 and extends below the lower edge of depending skirt 68 and is held in an easily rotatable position by means of an annular retainer ring 70 which is attached to the lower edge of depending skirt 68 by means of a plurality of bolts 72. Said retainer ring is beveled inwardly at its inner periphery to retain roller ball 28 in operable position when no weight of the appliance is on said ball. Said retainer ring extends outwardly to a point beyond the outer edge of said depending skirt 68.

Annular piston 74 is slidably received in annular groove 64. The lower inner periphery of said circular piston is indented, said indentation 82 extending to a point adjacent the upper surface of said circular piston. Annular cup 76 is attached to the upper side of annular piston 74 and slides with said piston and is conformable to annular groove 64. Hydraulic fluid is admitted to said annular groove through hole 78 in upper side of housing 62.

When hydraulic fluid pressure is urged against circular cup 76, circular piston 74 is moved downwardly against spring 80. Said spring 80 is suitably placed adjacent the outer periphery of depending skirt 68 and disposed between retainer ring 70 and the upper end of indentation 82. When hydraulic fluid pressure is released from the circular cup 76, spring 80 urges circular piston upwardly.

A pad 84 of felt or other suitable material is attached to the lower surface of piston 74 to protect the floor surface on which the device is resting.

In the modified form the caster is attached to the furniture or appliance 42 by means of a plurality of bolts 86 which extend through the lower portion of the appliance and are attached to the upper portion of the housing 62.

Thus it can be readily seen that when the caster in the modified form is in its normal position the roller ball 28 is resting on the floor surface as shown in Fig. 6 and the appliance or furniture can be easily moved about. When hydraulic fluid pressure is exerted on circular cup 76, said cup and piston 74 are moved downwardly and the weight of the furniture or appliance is supported on the said piston and the roller ball is moved relatively upwardly above the floor surface.

Having fully described my invention what I claim is:

A hydraulic caster lift comprising a housing forming a hydraulic cylinder open at its lower end, said housing presenting a horizontal shoulder intermediate its ends extending outwardly at the lower end of said hydraulic cylinder, a piston carried operably in said cylinder, a roller carried operably in said piston and extending below said piston, a cup conformable to inner walls of said hydraulic cylinder attached to the upper end of said piston, a flange formed on the outer periphery of said piston extending horizontally therefrom and disposed below said shoulder, a plurality of depending bolts attached to said shoulder and extending slidably through said piston flange, resilient means carried by said bolts and disposed between heads of said bolts and said piston flange whereby to urge said piston to the upper end of its stroke, and means whereby hydraulic fluid is introduced into said cylinder at a point above said cup for moving said piston from a position entirely within said housing to a position extending below said housing.

GILBERT L. LEWIS.

References Cited in the file of this patent

UNITED STATES PATENTS

| Number | Name | Date |
| --- | --- | --- |
| 1,016,324 | Dunn | Feb. 6, 1912 |
| 2,045,524 | Fehrmann | June 23, 1936 |
| 2,226,970 | Engel | Dec. 31, 1940 |